United States Patent
Luo et al.

(10) Patent No.: US 11,604,135 B2
(45) Date of Patent: Mar. 14, 2023

(54) CNT ASSEMBLED THIN FILM MODIFIED STEEL WIRE ARRAY ELECTRODE, PREPARATION METHOD AND APPLICATION THEREOF

(71) Applicant: QINGDAO UNIVERSITY OF TECHNOLOGY, Shandong (CN)

(72) Inventors: Jianlin Luo, Qingdao (CN); Zuquan Jin, Qingdao (CN); Xueqing Zhu, Qingdao (CN); Jigang Zhang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 347 days.

(21) Appl. No.: 16/850,381

(22) Filed: Apr. 16, 2020

(65) Prior Publication Data
US 2021/0325294 A1    Oct. 21, 2021

(51) Int. Cl.
| | | |
|---|---|---|
| *G01N 17/02* | (2006.01) | |
| *H01B 1/04* | (2006.01) | |
| *G01N 27/30* | (2006.01) | |
| *H01B 7/00* | (2006.01) | |
| *G01N 17/00* | (2006.01) | |

(52) U.S. Cl.
CPC .......... *G01N 17/02* (2013.01); *G01N 17/006* (2013.01); *G01N 27/308* (2013.01); *H01B 1/04* (2013.01); *H01B 7/0009* (2013.01)

(58) Field of Classification Search
CPC .... G01N 17/02; G01N 17/006; G01N 27/308; H01B 1/04; H01B 7/0009
See application file for complete search history.

(56) References Cited

U.S. PATENT DOCUMENTS

| | | | | |
|---|---|---|---|---|
| 7,413,474 B2 * | 8/2008 | Liu | ................... | H01B 11/1808 439/579 |
| 8,445,788 B1 * | 5/2013 | Tsotsis | ................... | H01B 1/24 174/126.1 |

FOREIGN PATENT DOCUMENTS

CN         105953821 A      9/2016

* cited by examiner

*Primary Examiner* — Paul M. West
(74) *Attorney, Agent, or Firm* — Oliff PLC

(57) ABSTRACT

A carbon nanotube (CNT) assembled thin film modified steel wire array electrode, a preparation method and application thereof. The array electrode includes: a surface of a steel wire is negatively modified, and the surface of the steel wire is assembled with a plurality of layers of CNT thin films; one end of the steel wire is welded to a conductor, and a welding position between the steel wire and the conductor is wrapped with an insulating heat shrinkable tube; and the insulating template and the steel wire are encapsulated and cured by using an epoxy resin. The preparation method of the array electrode of the invention mainly includes the following steps: first, performing negative modification on a steel wire, then, assembling CNT thin films on the steel wire, and preparing the modified array steel wire into the CNT assembled thin film modified steel wire array electrode.

12 Claims, 2 Drawing Sheets

CNT ASSEMBLED THIN FILM MODIFIED STEEL WIRE ARRAY ELECTRODE, PREPARATION METHOD AND APPLICATION THEREOF

BACKGROUND

Technical Field

The invention belongs to the technical field of electrochemical testing, and in particular relates to a carbon nanotube (CNT) assembled thin film modified steel wire array electrode, a preparation method and application thereof.

Related Art

Project structures, such as building structures, bridge tunnels, wind energy nuclear power, drilling platforms, harbor wharfs and thermoelectric chimneys, often fail prematurely due to corrosion in harsh marine environments. Among three major factors of steel bar corrosion, frost damage and physicochemical effects, steel bar corrosion is the most important factor affecting the durability of marine structures. The investigation and study also found that due to the steel bar corrosion, the project safety service life in the marine environment is only 15-20 years, and the service life is much lower than the expected value of the standard design. Existing scholars have developed a steel bar corrosion current sensor that may obtain the critical chloride ion arrival depth information in the structural concrete protective layer under the marine environment in time and may effectively learn the steel bar rust expansion stress in the marine structure. The steel bar corrosion current sensor may perform effective and timely early warning for structural cracking and spalling, and finally provide theoretical basis and project safety for corrosion protection or repair measures that may be required.

CNT has excellent chemical stability, mechanical toughness, electrical/thermal performance and the like. Therefore, domestic and foreign scholars have tried to incorporate CNT with excellent performance as a conductive reinforcing phase into macroscopic cement, mortar and ceramic matrixes to develop into an embedded sensor, or deposit or assemble the CNT on a rigid substrate such as a silicon wafer or glass, or on a flexible substrate such as stainless steel or polyimide to develop into an externally bonded thin film sensor. At the same time, the layer-by-layer self-assembly (LBL) technology refers to a technology in which two substances deposited alternately layer by layer spontaneously associate to form a thin film with structural integrity, stable performance and a certain specific function under the interaction (for example, electrostatic attraction, hydrogen bonds, coordination bonds and the like) between molecules of layers. Due to the advantages of controllable film thickness, simple operation and the like, the LBL technology has received more and more attentions. Chinese patent ZL201610473869.7 has developed a CNT-based piezoresistive/piezoelectric sandwich material and a preparation method of a sandwich sensor, in which the LBL method is used to assemble the CNTs on a ductile substrate to serve as a piezoresistive sensing layer.

An array electrode is composed of a series of tiny electrodes through regular arrangement. During the test, all electrode wires are coupled together through an external circuit, and electrons may flow freely among the tiny electrodes, so that the electrochemical behavior of the entire electrode is similar to that of a single sheet electrode. The array electrode has been successfully applied to the local corrosion detection of various projects, such as crevice corrosion, waterline corrosion, holecorrosion, oil-water interface corrosion, organic coating failure, microorganism erosion and the like.

In the existing technology, a wire beam electrode with a tightly and regularly arranged array obtained by using metal wires and epoxy encapsulation has been disclosed, which has the advantages of low cost, good controllability, simple operation and stable and reliable electrochemical signals. However, although a two-step epoxy encapsulation method is used in the process of manufacturing and encapsulating the array electrode, there is no means to avoid construction joints left by casting the epoxy interface layer at different times. The smooth steel wires and epoxy resin layer still have the debonding phenomenon, especially in the case of frequent and repeated use.

At present, there is no preparation method of assembling a CNT thin film on a steel wire electrode to prepare an electrode wire with excellent performance.

Therefore, it is necessary to provide an improved technical solution aiming at the above-mentioned defects in the existing technology.

SUMMARY

An objective of the invention is to provide a CNT assembled thin film modified steel wire array electrode, a preparation method and application thereof. CNT thin films are assembled on a steel wire to improve electrochemical characteristics and electrode corrosion parameter sensing sensitivity of electrode wires in a corresponding array electrode, and the array electrode is applied to marine structure steel bar corrosion detection.

To achieve the above objective, the invention provides the following technical solutions:

A CNT assembled thin film modified steel wire array electrode, the array electrode includes:

steel wires, where a surface of the steel wire is negatively modified, the surface of the steel wire is assembled with several double layers of CNT thin films, a plurality of the steel wires are provided, and the plurality of steel wires constitute electrode wires of the array electrode;

a conductor, where one end of the steel wire is welded to the conductor, and a welding position between the steel wire and the conductor is wrapped with an insulating heat shrinkable tube;

an insulating template, where the insulating template is provided with a plurality of uniformly arranged holes, and the other end of each steel wire is inserted into the hole of the insulating template; and an epoxy resin, where the insulating template and the steel wire are encapsulated and cured by using the epoxy resin.

In the CNT assembled thin film modified steel wire array electrode as described above, preferably, the surface of the steel wire is subjected to an ozone or ultraviolet corona treatment technique to realize negative modification on the surface of the steel wire.

Preferably, the steel wire has a diameter of 0.03-5.0 mm and a length of 10-500 mm.

In the CNT assembled thin film modified steel wire array electrode as described above, preferably, 2-10 double layers of CNT thin films are assembled on the surface of the steel wire.

In the CNT assembled thin film modified steel wire array electrode as described above, preferably, the CNT is one of a single-wall CNT and a multi-wall CNT.

Preferably, the CNT is the single-wall CNT.

Preferably, the CNT has a diameter of 1-60 nm and a length of 2-50 μm.

In the CNT assembled thin film modified steel wire array electrode as described above, preferably, the conductor is a rainbow flat cable with 5-28 strands, 10-60 cores and a length of 50-500 mm.

In the CNT assembled thin film modified steel wire array electrode as described above, preferably, specifications of the insulating heat shrinkable tube are adapted to the steel wire, and the insulating heat shrinkable tube has a diameter of 1-6.0 mm and a length of 10-500 mm correspondingly.

In the CNT assembled thin film modified steel wire array electrode as described above, preferably, the insulating template is provided with (5-19)×(5-19) odd-numbered square array holes having a diameter of 1.5 mm, and a spacing between two adjacent holes is 0.5-3.0 mm.

Preferably, the insulating template is one of an epoxy resin insulating plate, a phenol-formaldehyde resin insulating plate and a urea-formaldehyde resin insulating plate.

Preferably, the insulating template is the phenol-formaldehyde resin insulating plate, the phenol-formaldehyde resin insulating plate is provided with 121 holes regularly arranged into 11×11 odd-numbered square array holes, and a spacing between two adjacent holes is 0.6 mm.

A preparation method of a CNT assembled thin film modified steel wire array electrode includes the following steps:

(1) technically treating a plurality of steel wires to achieve a negative modification effect on surfaces of the steel wires, thereby obtaining negatively modified steel wires;

(2) by using an LBL alternate assembly process, assembling several double layers of CNT thin films on a surface layer of the negatively modified steel wire obtained in step (1) to prepare a CNT assembled thin film modified steel wire;

(3) welding one end of the CNT assembled thin film modified steel wire obtained in step (2) to one end of a conductor, and wrapping a welding position with an insulating heat shrinkable tube in an insulating manner to form a modified electrode wire;

(4) inserting the other end of the modified electrode wire obtained in step (3) into holes of a plurality of insulating templates sequentially placed in parallel to form a CNT assembled thin film modified steel wire electrode wire array;

(5) measuring insulativity between the modified electrode wires and conductivity between the steel wire and the conductor by using a multimeter to ensure good insulativity between the modified electrode wires and good conductivity between the steel wire and the conductor; and (6) putting the CNT assembled thin film modified steel wire electrode wire array into a polyethylene mold, and performing one-time casting and encapsulation molding by using an epoxy resin to obtain the CNT assembled thin film modified steel wire array electrode.

The preparation method of the CNT assembled thin film modified steel wire array electrode as described above, preferably, 3 insulating templates are provided in step (4), and a spacing between two adjacent insulating templates is 10-100 mm.

Application of a CNT assembled thin film modified steel wire array electrode, and the array electrode is applied to local corrosion detection and early warning of marine structure steel bars.

Compared with the closest existing technology, the technical solutions provided by the invention have the following excellent effects:

Compared with the existing steel wire array electrode, the preparation method of the CNT assembled thin film modified steel wire array electrode provided by the invention mainly has the following excellent effects:

1. The one-time casting and molding process is used for the epoxy resin encapsulation layer, so that construction joints left by casting the epoxy interface layer at different times are effectively avoided.

2. In combination with a surface modification function and CNT thin film assembly modification, a debonding phenomenon between the smooth steel wire and the epoxy resin layer is effectively improved, and the system integrity in the case of frequent and repeated use is effectively ensured.

3. The CNT conductive thin films are assembled on the surface of the steel wire electrode to improve electrochemical characteristics of the steel wire electrodes in the corresponding array electrode, thereby effectively enhancing the corrosion parameter sensing sensitivity, and comprehensively enhancing the local corrosion detection sensitivity and long-term effectiveness of marine structures.

BRIEF DESCRIPTION OF THE DRAWINGS

The accompanying drawings constituting a part of the invention are used for providing further understanding for the invention. Exemplary embodiments of the invention and descriptions thereof are used for explaining the invention and do not constitute an improper limitation to the invention.

In the FIGURE: 1. steel wire; 2. CNT thin film; 3. epoxy resin; 4. polyethylene mold.

Figure 2:
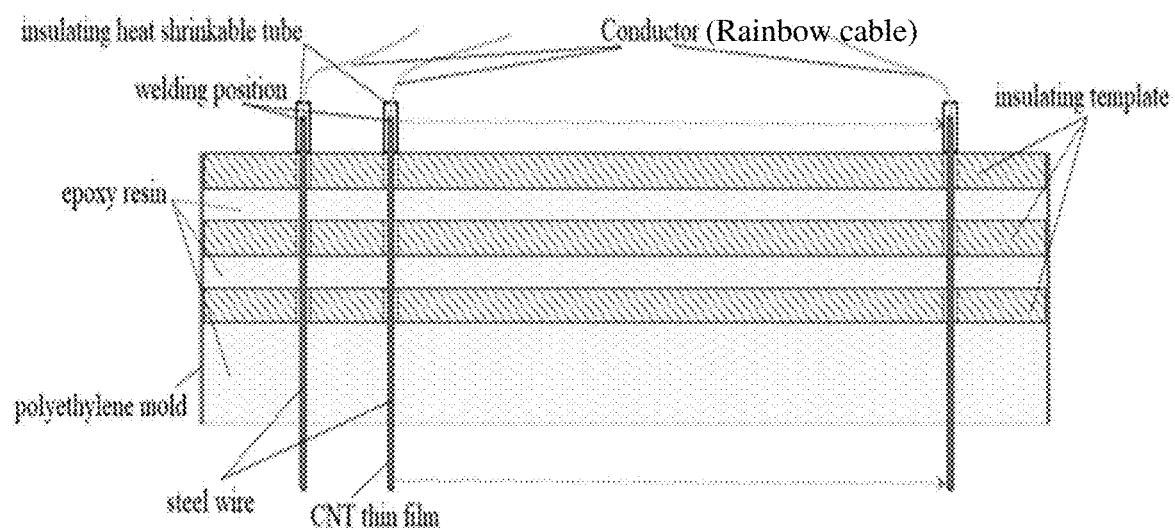

FIG. 2 is a side sectional view of the carbon nanotube (CNT) assembled thin film modified steel wire array electrode of the present invention.

DETAILED DESCRIPTION

The following clearly and completely describes the technical solutions of the embodiments of the invention. Apparently, the described embodiments are merely some rather than all of the embodiments of the invention. All other embodiments obtained by a person of ordinary skill in the art based on the embodiments of the invention shall fall within the protection scope of the invention.

The invention is described in detail below with reference to the accompanying drawings and the embodiments. It should be noted that the embodiments in the invention and features in the embodiments can be combined with each other in the case of no conflict.

A CNT assembled thin film modified steel wire array electrode provided by the invention is different from the traditional steel wire array electrode. First, a surface of the traditional steel wire is negatively modified. Then, a certain number of double layers of CNT thin films are assembled on the surface of the steel wire by an LBL process to prepare a CNT thin film modified steel wire. Finally, the modified steel wire is welded to a conductor, insulating templates are inserted, and an epoxy resin is cast at one time by encapsulation and curing to obtain the CNT assembled thin film modified steel wire array electrode.

A preparation method of the CNT assembled thin film modified steel wire array electrode is simple and convenient to operate.

When the CNT assembled thin film modified steel wire array electrode prepared in the invention is applied to local corrosion detection and early warning of marine structure steel bars, the debonding phenomenon between the steel wire and the epoxy resin may be effectively improved. The one-time casting and encapsulation method used may avoid construction joints left by casting the epoxy interface layer at different times and effectively enhance electrode corrosion parameter sensing sensitivity of electrode wires.

Figure 1:
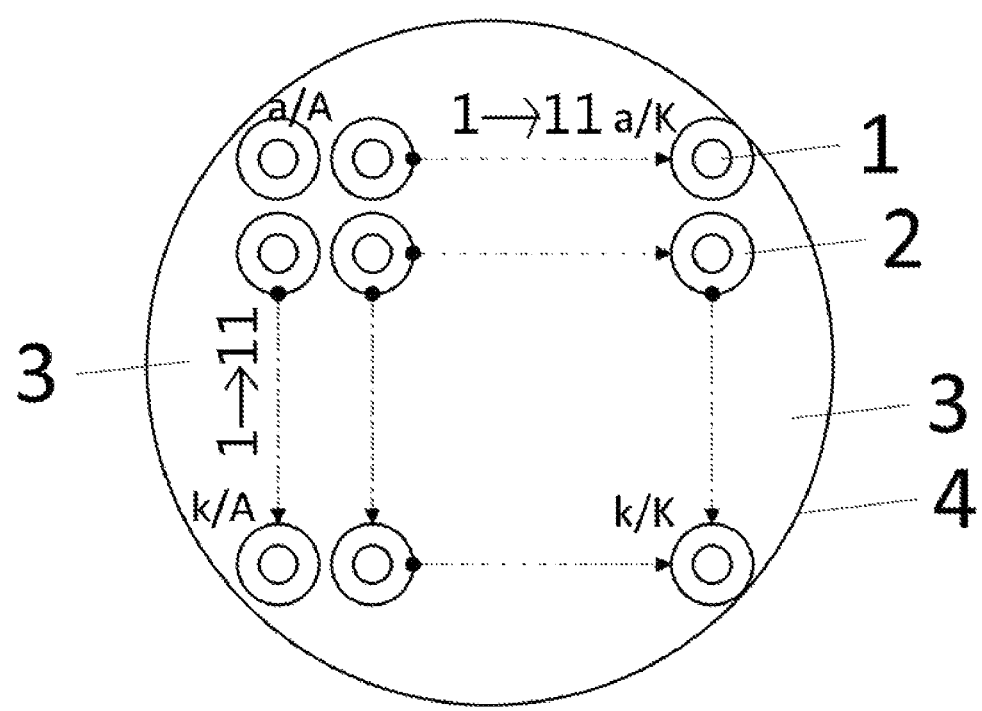
FIG. 1 is a cross-sectional view of a CNT assembled thin film modified steel wire array electrode according to an embodiment of the invention.

As shown in FIG. 1, a CNT assembled thin film modified steel wire array electrode provided by the invention includes:

steel wires; a surface of the steel wire 1 is negatively modified, the surface of the steel wire 1 is assembled with several double layers of CNT thin films 2, and a plurality of the steel wires 1 are provided to constitute electrode wires of the array electrode.

In a specific embodiment of the invention, the surface of the steel wire 1 is subjected to an ozone or ultraviolet corona treatment technique to realize negative modification on the surface of the steel wire 1.

In a specific embodiment of the invention, the steel wire 1 has a diameter of 0.03-5.0 mm (for example, 0.03 mm, 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.5 mm, 2.0 mm, 2.5 mm, 3.0 mm, 3.5 mm, 4.0 mm, 4.5 mm, 5.0 mm) and a length of 10-500 mm (for example, 10 mm, 20 mm, 30 mm, 40 mm, 50 mm, 60 mm, 70 mm, 80 mm, 90 mm, 100 mm, 150 mm, 200 mm, 250 mm, 300 mm, 350 mm, 400 mm, 450 mm, 500 mm). Preferably, the steel wire 1 has a diameter of 1.5 mm and a length of 50 mm.

In a specific embodiment of the invention, 2-10 (for example, 2, 3, 4, 5, 6, 7, 8, 9, 10) layers of CNT thin films 2 are assembled on the surface of the steel wire 1.

Preferably, the CNT is one of a single-wall CNT and a multi-wall CNT.

Preferably, the CNT is the single-wall CNT.

In a specific embodiment of the invention, the CNT has a diameter of 1-60 nm (for example, 2 nm, 3 nm, 4 nm, 5 nm, 6 nm, 7 nm, 8 nm, 9 nm, 10 nm, 15 nm, 20 nm, 25 nm, 30 nm, 35 nm, 40 nm, 45 nm, 50 nm, 55 nm) and a length of 2-50 μm (for example, 4 μm, 6 μm, 8 μm, 10 μm, 12 μm, 14 μm, 16 μm, 18 μm, 20 μm, 22 μm, 24 μm, 26 μm, 28 μm, 30 μm, 32 μm, 34 μm, 36 μm, 38 μm, 40 μm, 42 μm, 44 μm, 46 μm, 48 μm).

A conductor; one end of the steel wire 1 is welded to the conductor, and a welding position between the steel wire 1 and the conductor is wrapped with an insulating heat shrinkable tube.

In a specific embodiment of the invention, the conductor is a rainbow flat cable with 5-28 strands (for example, 6 strands, 7 strands, 8 strands, 9 strands, 10 strands, 11 strands, 12 strands, 13 strands, 14 strands, 15 strands, 16 strands, 17 strands, 18 strands, 19 strands, 20 strands, 21 strands, 22 strands, 23 strands, 24 strands, 25 strands, 26 strands, 27 strands), 10-60 cores (for example, 15 cores, 20 cores, 25 cores, 30 cores, 35 cores, 40 cores, 45 cores, 50 cores, 55 cores) and a length of 50-500 mm (for example, 50 mm, 100 mm, 150 mm, 200 mm, 250 mm, 300 mm, 350 mm, 400 mm, 450 mm). Preferably, the conductor is a rainbow flat cable with 5 strands, 25 cores and a length of 400 mm.

In a specific embodiment of the invention, specifications of the insulating heat shrinkable tube are adapted to the CNT assembled thin film 2 steel wire 1, and the insulating heat shrinkable tube has a diameter of 1-6.0 mm (for example, 2 mm, 3 mm, 4 mm, 5 mm) and a length of 10-500 mm (for example, 10 mm, 20 mm, 30 mm, 40 mm, 50 mm, 60 mm, 70 mm, 80 mm, 90 mm, 100 mm, 150 mm, 200 mm, 250 mm, 300 mm, 350 mm, 400 mm, 450 mm, 500 mm) correspondingly. Preferably, the insulating heat shrinkable tube has a diameter of 2 mm and a length of 10 mm.

An insulating template; the insulating template is provided with a plurality of uniformly arranged holes, and the other end of each steel wire 1 is inserted into the hole of the insulating template.

In a specific embodiment of the invention, the insulating template is provided with (5-19)×(5-19) (for example, 5×5, 7×7, 9×9, 11×11, 13×13, 15×15, 17×17) odd-numbered square array holes with a diameter of 1.5 mm, the holes are arranged into a 5×5-19×19 regular array, and a spacing between two adjacent holes may be 0.5-3.0 mm (for example, 0.5 mm, 0.6 mm, 0.7 mm, 0.8 mm, 0.9 mm, 1.0 mm, 1.5 mm, 2.0 mm, 2.5 mm, 3.0 mm).

Preferably, the insulating template is one of an epoxy resin insulating plate, a phenol-formaldehyde resin insulating plate and a urea-formaldehyde resin insulating plate.

Preferably, the insulating template is the phenol-formaldehyde resin insulating plate, the phenol-formaldehyde resin insulating plate is provided with 121 holes regularly arranged into 11×11 odd-numbered square array holes, and a spacing between two adjacent holes is 0.6 mm.

An epoxy resin; the insulating template and the steel wire 1 are encapsulated and cured by using the epoxy resin 3.

In a specific embodiment of the invention, the epoxy resin 3 is a structural epoxy resin 3 with low thermal expansion coefficient and high durability.

In order to well understand the CNT assembled thin film modified steel wire array electrode of the invention, the invention further provides a preparation method of the CNT assembled thin film modified steel wire array electrode, including the following steps:

(1) A plurality of steel wires 1 are respectively subjected to a certain treatment process to achieve a negative modification effect on surfaces of the steel wires 1, thereby obtaining negatively modified steel wires 1.

(2) By using an LBL alternate assembly process, several double layers of CNT thin films 2 are assembled on a surface layer of the negatively modified steel wire 1 obtained in step (1) to prepare a CNT assembled thin film modified steel wire 1.

(3) One end of the CNT assembled thin film modified steel wire 1 obtained in step (2) is welded to one end of a conductor, and a welding position is wrapped with an insulating heat shrinkable tube in an insulating manner to form a modified electrode wire.

(4) The other end of the modified electrode wire obtained in step (3) is inserted into holes of a plurality of insulating templates sequentially placed in parallel to form a CNT assembled thin film modified steel wire electrode wire array.

(5) Insulativity between the modified electrode wires and conductivity between the steel wire 1 and the conductor are measured by using a multimeter to ensure good insulativity between the modified electrode wires and good conductivity between the steel wire 1 and the conductor.

(6) The CNT assembled thin film modified steel wire electrode wire array is put into a polyethylene mold 4, and one-time casting and encapsulation molding is performed by using an epoxy resin 3 to obtain the CNT assembled thin film modified steel wire array electrode.

In a specific embodiment of the invention, 3 insulating templates are provided in step (4), and a spacing between two adjacent insulating templates is 10-100 mm (for example, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm). Preferably, the spacing between two adjacent insulating templates is 20 mm.

Application of the CNT assembled thin film modified steel wire array electrode, and the array electrode is applied to local corrosion detection and early warning of marine structure steel bars.

Embodiment 1

The invention provides a preparation method of a CNT assembled thin film modified steel wire array electrode.

The steel wires used were 65# type (according to YB/T 5311 Chinese criteria, the same as follow), and the CNT assembled thin films were 2 double layers of multi-wall CNT thin films.

The method includes the following steps:

As shown in FIG. 1, in the first step, 121 steel wires having a diameter of 1.5 mm and a length of 50 mm were subjected to an ozone treatment process (treated in a closed environment for 24 h) to achieve a negative modification effect on surfaces of the metal wires.

In the second step, by using an LBL alternate assembly process (10 min positively charged electrolyte-3 min deionized water rinsing-15 min air drying-20 min negatively charged CNTs), 2 layers of CNT double-wall thin films were assembled on surface layers of 121 negatively modified steel wires to prepare CNT assembled thin film modified steel wires.

In the third step, one ends of the 121 CNT assembled thin film modified steel wires were respectively welded with one end of a 25-core rainbow flat cable with 5 strands and a length of 400 mm, and welding positions were respectively wrapped with 121 insulating heat shrinkable tubes having a length of 10 mm and a diameter of 2 mm in an insulating manner.

In the fourth step, the CNT assembled thin film modified steel wire electrode wires subjected to the insulating treatment were sequentially inserted into 3 phenol-formaldehyde resin insulating templates with 121 holes having a diameter of 1.5 mm and a hole spacing of 0.6 mm to form a 11×11 electrode wire array. The 3 insulating templates were sequentially placed in parallel, keeping the spacing at 20 mm.

In the fifth step, insulativity between the CNT assembled thin film modified steel wire electrode wires and conductivity between the steel wire and the conductor were tested by using a multimeter. After ensuring good insulativity between the electrode wires and good conductivity between the steel wire and the conductor, the CNT assembled thin film modified steel wire electrode wire array was put into a polyethylene mold having an inner diameter of 40 mm, and one-time casting and encapsulation molding was performed by using an epoxy resin.

Performance Detection

After the epoxy resin was solidified, the surface layer resin was polished off, and an electrochemical workstation was used to sequentially test a current between each electrode wire and the remaining 120 electrode wires coupled together after being immersed in simulated seawater (a 3.5% NaCl solution) containing concrete corrosive liquid for 2 h, 1 d, 3 d, 7 d, 21 d, 30 d and 60 d respectively. It was found that the corresponding current distribution diagram began to have an anode current peak after 7 d; with the extension of the immersion time, the peak value increased significantly, and the maximum anode current reached 8.57 $\mu A \cdot cm^{-2}$ at 60 d, it indicated that after the 65# steel was immersed in the simulated seawater for 7 d, the surface electrochemical properties began to show uneven distribution, and also effectively characterized that the chloride ion concentration in the structural concrete protective layer in the marine environment reached a critical value; and at 60 d, corrosion of steel bars occurred.

Embodiment 2

In the preparation method of the present embodiment, the steel wires used were 70# type, the CNT assembled thin films were 6 double layers of double-wall CNT thin films, and other method steps were the same as those in Embodiment 1 and are not repeated here.

Performance Detection

After the epoxy resin was solidified, the surface layer resin was polished off, and an electrochemical workstation was used to sequentially test a current between each electrode wire and the remaining 120 electrode wires coupled together after being immersed in simulated seawater (a 3.5% NaCl solution) containing concrete corrosive liquid for 2 h, 1 d, 3 d, 7 d, 21 d, 30 d and 60 d respectively. It was found that the corresponding current distribution diagram also began to have an anode current peak after 7 d; with the extension of the immersion time, the peak value increased significantly, and the maximum anode current reached 12.38 $\mu A \cdot cm^{-2}$ at 60 d, it indicated that after the 70# steel was immersed in the simulated seawater for 7 d, the surface electrochemical properties began to show uneven distribution, and also effectively characterized that the chloride ion concentration in the structural concrete protective layer in the marine environment reached a critical value; and at 60 d, severe corrosion of steel bars occurred, and rust expansion began.

Embodiment 3

In the preparation method in the present embodiment, the steel wires used were 72A type steel wires having a diameter of 1 mm and a length of 300 mm, the CNT assembled thin films were 10 double layers of single-wall CNT thin films, the conducting wire was a rainbow flat cable with 12 strands, 28 cores and a length of 300 mm, and other method steps were the same as those in Embodiment 1 and are not repeated here.

Performance Detection

After the epoxy resin was solidified, the surface layer resin was polished off, and an electrochemical workstation was used to sequentially test a current between each electrode wire and the remaining 120 electrode wires coupled together after being immersed in simulated seawater (a 3.5% NaCl solution) containing concrete corrosive liquid for 2 h, 1 d, 3 d, 7 d, 21 d, 30 d and 60 d respectively. It was found that the corresponding current distribution diagram also began to have an anode current peak after 7 d; with the extension of the immersion time, the peak value increased significantly, and the maximum anode current reached 22.05 $\mu A \cdot cm^{-2}$ at 60 d, it indicated that after the 72A steel wires were immersed in the simulated seawater for 7 d, the surface electrochemical properties began to show uneven distribution, and also effectively characterized that the chloride ion concentration in the structural concrete protective layer in the marine environment reached a critical value; and at 60 d, severe corrosion of steel bars occurred, and rust expansion began.

Comparative Example 1

In the present comparative example, a two-step encapsulation method was used in step (6). First, an electrode wire array was pre-encapsulated, after the epoxy resin was solidified, the pre-encapsulated electrode array was then put into a polyethylene mold having an inner diameter of 40 mm, and encapsulation molding was performed again by using the epoxy resin. Other method steps were the same as those in Embodiment 1 and are not repeated here.

Performance Detection

The array electrode using the two-step encapsulation method had the resin interface layer visible to naked eyes. After the array electrode was immersed in simulated seawater (a 3.5% NaCl solution) containing concrete corrosive liquid for 30 d, it could be seen under an optical microscope that significant interface stratification and debonding occurred and the insulation effect was lost.

Comparative Example 2

In the present comparative example, step (1) and step (2) were omitted, that is, CNT thin films were not assembled on the surface of the steel wire, and other method steps were the same as those in Embodiment 1 and are not repeated here.

Performance Detection

Similarly, an electrochemical workstation was used to sequentially test a current and a corrosion potential between each steel wire electrode wire and the remaining 120 steel wire electrode wires coupled together after the steel wire array electrode not subjected to CNT thin film assembly was immersed in simulated seawater (a 3.5% NaCl solution) containing concrete corrosive liquid for 2 h, 1 d, 3 d, 7 d, 21 d, 30 d and 60 d respectively. It was found that the corresponding current distribution diagram began to have an anode current peak after 21 d while the corrosion potential at this time reached −786 mV (it indicated that corrosion had occurred), and the anode current peak value reached 5.34 $\mu A \cdot cm^{-2}$ until 60 d of immersion, it indicated that the steel wire array electrode not subjected to CNT thin film assembly could not quickly reflect its own corrosion state and the corresponding corrosion parameter sensing sensitivity was much lower than that of the array electrode in Embodiment 1.

According to the array electrode using the two-step encapsulation method, due to the presence of the resin interface layer, it is easy to debond between the steel wire and the resin and lose the insulation effect. According to the steel wire array electrode not subjected to CNT thin film assembly, the anode current peak occurs after a longer time (after 21 d), the anode current peak value under the same corrosion time is also the lowest (5.34 $\mu A \cdot cm^{-2}$), and the corrosion parameter sensing sensitivity is inferior to that of the steel wire array electrode subjected to CNT thin film assembly provided in the invention. The steel wire array electrode prepared in the invention has higher sensitivity, good insulation effect and longer service life.

In summary, the invention provides a preparation method of a CNT assembled thin film modified steel wire array electrode, which has significant technical effects. First, the one-time casting and molding process is used for the epoxy resin encapsulation layer, so that construction joints left by casting the epoxy interface layer at different times are effectively avoided. Second, in combination with surface function modification and CNT thin film assembly modification, a debonding phenomenon between the smooth steel wire and the epoxy resin layer is effectively improved, and the system integrity in the case of frequent and repeated use is effectively ensured. Third, the CNT conductive thin films are assembled on the surface of the steel wire electrode to improve electrochemical characteristics of the steel wire electrodes in the corresponding array electrode, thereby effectively enhancing the corrosion parameter sensing sensitivity, and comprehensively enhancing the local corrosion detection sensitivity and long-term effectiveness of marine structures.

When the CNT assembled thin film modified steel wire array electrode of the invention is applied to local corrosion detection and early warning of marine structure steel bars, the construction joints left by casting the epoxy interface layer at different times are effectively avoided, and the debonding phenomenon between the smooth steel wire and the epoxy resin layer is effectively improved. At the same time, the CNT thin films are assembled on the surface of the steel wire electrode to improve electrochemical characteristics of the steel wires in the corresponding array electrode, thereby effectively enhancing the electrode corrosion parameter sensing sensitivity, and comprehensively enhancing the local corrosion detection sensitivity and long-term effectiveness of marine structures.

The foregoing descriptions are merely preferred embodiments of the invention, but are not intended to limit the invention. A person skilled in the art may make various alterations and variations to the invention. Any modification, equivalent replacement, or improvement made within the spirit and principle of the invention shall fall within the protection scope of the invention.

What is claimed is:

1. A carbon nanotube (CNT) assembled thin film modified steel wire array electrode, wherein the array electrode comprises:
   a plurality of steel wires, wherein a surface of each steel wire is negatively modified and assembled with several double layers of CNT thin films, and the plurality of steel wires constitute electrode wires of the array electrode;
   a conductor, wherein one end of the steel wire is welded to the conductor, and a welding position between the steel wire and the conductor is wrapped with an insulating heat shrinkable tube;
   an insulating template, wherein the insulating template is provided with a plurality of uniformly arranged holes, and another end of the steel wire is inserted into the hole of the insulating template; and
   an epoxy resin, wherein the insulating template and the steel wire are encapsulated and cured by using the epoxy resin.

2. The CNT assembled thin film modified steel wire array electrode according to claim 1, wherein the surface of the steel wire is subjected to an ozone or ultraviolet corona treatment technique to realize negative modification on the surface of the steel wire; and
   the steel wire has a diameter of 0.03-5.0 mm and a length of 10-500 mm.

3. The CNT assembled thin film modified steel wire array electrode according to claim 1, wherein 2-10 double layers of CNT thin films are assembled on the surface of the steel wire.

4. The CNT assembled thin film modified steel wire array electrode according to claim 3, wherein the CNT is one of a single-wall CNT and a multi-wall CNT.

5. The CNT assembled thin film modified steel wire array electrode according to claim 4, wherein the CNT is a single-wall CNT.

6. The CNT assembled think film modified steel wire array electrode according to claim 4, wherein the CNT has a diameter of 1-60 nm and a length of 2-50 m.

7. The CNT assembled thin film modified steel wire array electrode according to claim 1, wherein the conductor is a rainbow flat cable with 5-28 strands, 10-60 cores and a length of 50-500 mm.

8. The CNT assembled thin film modified steel wire array electrode according to claim 1, wherein specifications of the insulating heat shrinkable tube are adapted to the steel wire, and the insulating heat shrinkable tube has a diameter of 1-6.0 mm and a length of 10-500 mm correspondingly.

9. The CNT assembled thin film modified steel wire array electrode according to claim 1, wherein the insulating template is provided with (5-19)×(5-19) odd-numbered square array holes;
   the hole in the insulating template has a diameter of 1.5 mm, and a spacing between two adjacent holes is 0.5-3.0 mm;
   the insulating template is one of an epoxy resin insulating plate, a phenol-formaldehyde resin insulating plate and a urea-formaldehyde resin insulating plate; and
   the insulating template is the phenol-formaldehyde resin insulating plate, the phenol-formaldehyde resin insulating plate is provided with 121 holes regularly arranged into 11×11 odd-numbered square array holes, and a spacing between two adjacent holes is 0.6 mm.

10. A method for preparing the CNT assembled thin film modified steel wire array electrode according to claim 1, the method comprising:
   (1) technically treating the plurality of steel wires to achieve a negative modification effect on surfaces of the steel wires, thereby obtaining negatively modified steel wires;
   (2) by using an LBL alternate assembly process, assembling several double layers of CNT thin films on a surface layer of each negatively modified steel wire obtained in step (1) to prepare a CNT assembled thin film modified steel wire;
   (3) welding one end of the CNT assembled thin film modified steel wire obtained in step (2) to one end of a conductor, and wrapping a welding position with an insulating heat shrinkable tube in an insulating manner to form a modified electrode wire;
   (4) inserting another end of the modified electrode wire obtained in step (3) into holes of a plurality of insulating templates sequentially placed in parallel to form a CNT assembled thin film modified steel wire electrode wire array;
   (5) measuring insulativity between the modified electrode wires and conductivity between the steel wire and the conductor by using a multimeter to ensure good insulativity between the modified electrode wires and good conductivity between the steel wire and the conductor; and
   (6) putting the CNT assembled thin film modified steel wire electrode wire array into a polyethylene mold, and performing one-time casting and encapsulation molding by using an epoxy resin to obtain the CNT assembled thin film modified steel wire array electrode.

11. The preparation method of the CNT assembled thin film modified steel wire array electrode according to claim 10, wherein 3 insulating templates are provided in step (4), and a spacing between two adjacent insulating templates is 10-100 mm.

12. An application of the CNT assembled thin film modified steel wire array electrode according to claim 1, wherein the array electrode is applied to local corrosion detection and early warning of marine structure steel bars.

* * * * *